(12) United States Patent
Busch

(10) Patent No.: US 7,231,760 B2
(45) Date of Patent: Jun. 19, 2007

(54) INTERNAL COMBUSTION ENGINE WITH EXHAUST-GAS TURBOCHARGER AND SECONDARY AIR INJECTION

(75) Inventor: Michael-Rainer Busch, Ebersbach (DE)

(73) Assignee: DaimlerChrysler AG, Stuttgart (DE)

( * ) Notice: Subject to any disclaimer, the term of this patent is extended or adjusted under 35 U.S.C. 154(b) by 124 days.

(21) Appl. No.: 10/966,104

(22) Filed: Oct. 18, 2004

(65) Prior Publication Data

US 2005/0109029 A1    May 26, 2005

(30) Foreign Application Priority Data

Oct. 16, 2003   (DE)   ............................... 103 48 131

(51) Int. Cl.
*F01N 5/04*   (2006.01)
(52) U.S. Cl. ............................. 60/280; 60/274; 60/277; 60/289; 60/605.1
(58) Field of Classification Search .................. 60/274, 60/277, 280, 289, 324, 605.1, 606, 608, 611
See application file for complete search history.

(56) References Cited

U.S. PATENT DOCUMENTS

| | | | | |
|---|---|---|---|---|
| 3,988,894 | A * | 11/1976 | Melchior | 60/606 |
| 4,233,815 | A * | 11/1980 | Melchior | 60/606 |
| 4,674,283 | A | 6/1987 | Ishida et al. | |
| 5,724,813 | A * | 3/1998 | Fenelon et al. | 60/606 |
| 6,295,817 | B1 * | 10/2001 | Abthoff et al. | 60/612 |
| 6,687,601 | B2 * | 2/2004 | Bale et al. | 701/108 |
| 6,817,173 | B2 * | 11/2004 | Paffrath et al. | 60/293 |
| 6,883,323 | B2 * | 4/2005 | Hummel | 60/606 |
| 2002/0083700 | A1 | 7/2002 | Ellmer et al. | |
| 2004/0159312 | A1 | 8/2004 | Hummel | |

FOREIGN PATENT DOCUMENTS

| | | |
|---|---|---|
| JP | 58 077119 A | 5/1983 |
| JP | 06 323152 A | 11/1994 |
| WO | WO 02/052130 A1 | 7/2002 |

* cited by examiner

*Primary Examiner*—Tu M. Nguyen
(74) *Attorney, Agent, or Firm*—Norman N. Kunitz; Fitch, Even, Tabin & Flannery

(57) ABSTRACT

The invention relates to an internal combustion engine which has charge-air supercharging by means of an exhaust-gas turbocharger and secondary air injection, the flow path of which is selected in such a way that the quantity of secondary air injected has an influence on the rotational speed of the turbocharger. By monitoring the rotational speed of the turbocharger, an increase in the rotational speed caused by the secondary air injection is determined, and the quantity of secondary air injected is worked out from the increase in rotational speed.

This has the advantage that there is no need for complex temperature-measuring methods as have hitherto been employed. Rotational speed measurement can be carried out contactlessly and with absolutely no wear in particular by means of inductive rotational-speed sensors. Moreover, these inductive rotational-speed sensors can be miniaturized and produced at extremely low cost.

6 Claims, 4 Drawing Sheets

INTERNAL COMBUSTION ENGINE WITH EXHAUST-GAS TURBOCHARGER AND SECONDARY AIR INJECTION

CROSS REFERENCE TO RELATED APPLICATION

This application claims the priority of German Patent Application No. 103 48 131.1, filed on Oct. 16, 2003, the subject matter of which, in its entirety, is incorporated herein by reference.

FIELD OF THE INVENTION

The invention relates to an internal combustion engine with secondary air injection into the exhaust system of the internal combustion engine for aftertreatment of the combustion products in the exhaust-gas stream. Furthermore, the invention relates to a method for monitoring the secondary air injection and to the possibility of diagnosing the secondary air injection.

BACKGROUND OF THE INVENTION

En route to what is now the customary catalytic aftertreatment of the exhaust gases from an internal combustion engine, it was initially attempted to reduce exhaust emissions by thermal afterburning. Thermal afterburning allows the unburnt constituents still present in the exhaust gas to be afterburnt by a certain residence time at elevated temperatures. When the engine is running in a rich operating mode, what is known as secondary air injection is required for this purpose. When the engine is running in lean mode, the afterburning is effected by the residual oxygen which is still present in the exhaust gas. The use of catalytic converter technology meant that thermal afterburning was only still required during the warm-up phase of the engine. Thermal afterburning allows the emission of hydrocarbons and carbon monoxides to be abated in the operating phase up until the catalytic converter has reached its operating temperature. Therefore, the use of thermal aftertreatment with secondary air injection during the warm-up phase of the engine in combination with catalytic aftertreatment plays a significant role in complying with strict exhaust emission regulations by significantly shortening the heat-up time required to reach the operating temperature of the catalytic converter.

An internal combustion engine of the generic type and a method of the generic type for monitoring the secondary air injection are known, for example, from international patent application WO 02/052130 A1. This application includes a method and an apparatus for monitoring and determining a mass flow of secondary air which is injected into the exhaust system of an internal combustion engine. In this case, the secondary air is compressed using a compressor in the flow path of the secondary air injection and the mass flow is controlled using throttle valves, control valves and power control of the compressor. In this case, the delivery of secondary air is measured and monitored using a temperature sensor and a measurement principle which makes use of the fact that a temperature rise is recorded in the air compressed by the secondary air compressor. In this context, there is a direct relationship between the temperature rise caused by the compression process and the quantity of secondary air delivered by the compressor. The measured temperature values can therefore be assessed with regard to the delivery capacity of the secondary air compressor and in this way allow open-loop or closed-loop control of the latter.

This advantageously makes it possible to dispense with air mass sensors which are otherwise customary. Air mass sensors, for example based on hot-film strain gauges, are expensive and sensitive to soiling.

Working on the basis of the prior art described above, the invention is based on the object of providing an internal combustion engine with an alternative form of monitoring and control of the secondary air injection, in which as far as possible temperature sensors or air mass sensors can be dispensed with.

SUMMARY OF THE INVENTION

This object is substantially achieved by an internal combustion engine which has charge-air supercharging by means of an exhaust-gas turbocharger and secondary air injection, the flow path of which is selected in such a way that the quantity of secondary air injected influences the rotational speed of the turbocharger. An increase in the rotational speed caused by the secondary air injection is determined by monitoring the rotational speed of the turbocharger, and the quantity of secondary air injected is worked out from the increase in rotational speed.

This has the advantage that there is no need for complex temperature-measuring methods as have been employed hitherto. Rotational speed measurement can be carried out contactlessly and with absolutely no wear in particular using inductive rotational speed sensors. Moreover, these inductive rotational speed sensors can be miniaturized and produced at extremely low cost.

In one advantageous embodiment of the invention, the secondary air injection can be effected by means of compressed secondary air. For this purpose, a compressor, which may have a motor drive or a turbine drive, is arranged in the flow path of the secondary air.

In the preferred embodiment, the exhaust-gas turbocharger of the internal combustion engine which simultaneously compresses the charge air can be used to compress the secondary air. If a separate compressor is used to compress the secondary air, the two compression processes for the supercharging of the internal combustion engine and for the compression of the secondary air can be separated by virtue of the two flow paths for the charge air and for the secondary air beginning upstream of the compressor of the exhaust-gas turbocharger. The solution according to the invention also results in an advantageous method for monitoring the secondary air injection. This is because the change in rotational speed of the exhaust-gas turbocharger as a result of the secondary air injection is used to determine and control the quantity of secondary air delivered. Moreover, by monitoring the rotational speed of the exhaust-gas turbocharger it is possible to diagnose the secondary air injection by comparing the measured rotational speed of the exhaust-gas turbocharger with an expected, desired rotational speed corresponding to the operating point of the internal combustion engine and concluding that the secondary air injection is defective if there is a deviation from the expected, desired rotational speed.

Exemplary embodiments of the invention are explained in more detail below with reference to figures and without restricting the general nature of the invention.

DETAILED DESCRIPTION OF THE INVENTION

Figure 1:
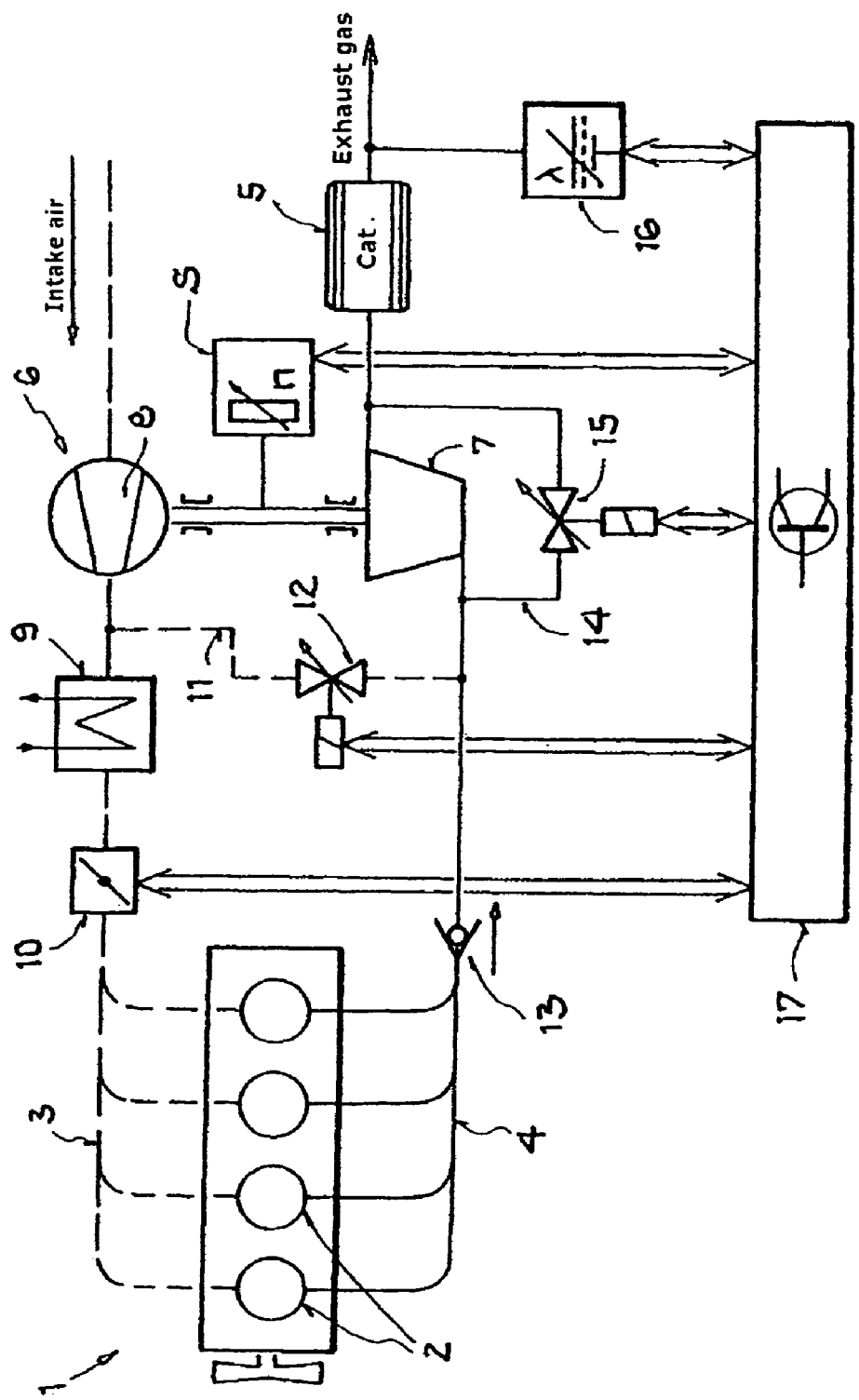
FIG. 1 shows an internal combustion engine with charge-air supercharging by an exhaust-gas turbocharger and secondary air injection.

FIG. 1 shows an internal combustion engine 1 having a plurality of combustion cylinders 2, which is supplied with charge air via an intake section 3, indicated by dashed lines, and fuel is added to the charge air with internal or external mixture formation. This ignitable mixture is ignited in the combustion cylinders 2, and the combustion products are discharged from the combustion cylinders via the exhaust system 4, which is illustrated by solid lines, and fed to a catalytic converter 5 for catalytic aftertreatment. An exhaust-gas turbocharger 6 has its turbine 7 in the flow path of the exhaust system and its compressor 8 in the flow path of the intake air. The compressed intake air can optionally be cooled using a charge-air cooler 9. For charge-air control, a throttle valve 10 is provided downstream of the charge-air compressor 8 and the charge-air cooler 9. A secondary-air line 11 branches off from the intake section downstream of the charge-air compressor 8 and leads, via a control valve 12, to the manifold of the exhaust system. The secondary-air line 11 opens out into the exhaust system downstream of the outlet valve 13 and upstream of the turbine 7 of the exhaust-gas turbocharger 6. The turbine side of the exhaust-gas turbocharger 6 can be bypassed by means of a controllable bypass 14. It is customary for the exhaust-gas turbocharger to be designed in such a way that a high boost pressure is established even at a low engine speed. However, this can cause the boost pressure to rise so strongly in the upper speed range that the engine would be overloaded. Therefore, in particular in the case of engines with a wide speed range, the turbine has to be bypassed via what is known as a waste gate, but this causes exhaust-gas energy to be lost. A control valve 15 can be used to control the waste gate. The rotational speed of the turbocharger 6 is monitored using an apparatus for rotational-speed determination S. This apparatus may be a conventional inductive rotational-speed sensor. The composition of the exhaust-gas stream itself is analyzed downstream of the catalytic converter 5 using a lambda sensor 16 in a manner known per se and monitored. To operate and monitor the combustion process in the internal combustion engine 1, all the control and regulating members and all the apparatuses for recording measured values are in communication with a control unit 17, which is preferably the engine control unit. The control unit 17 implements all the application programs for controlling the combustion process, controlling the charge-air induction and for controlling the exhaust section and the secondary air injection. Secondary air injection downstream of the outlet valve 13 is used, for example, to quickly heat up the catalytic converter 5 while the internal combustion engine is warming up. The energy required for this heat-up process is realized by the oxygen of the secondary air injection reacting with the oxidative exhaust-gas constituents of the rich-running engine by means of an exothermic reaction. This strategy can also be used for other heating steps which may be required, such as for example the burning of particulates in diesel particulate filters. The rotational speed of the exhaust-gas turbocharger is increased by the introduction of the secondary air between outlet valve and turbine of the exhaust-gas turbocharger. This increase in the rotational speed is directly related to the mass of secondary air injected, i.e. the higher the mass of secondary air injected, the higher the rotational speed of the exhaust-gas turbocharger. The increase in rotational speed as a result of the secondary air injection is determined under defined stability conditions for the operating point of the internal combustion engine, such as for example a constant engine speed or recording of the change in the speed of the internal combustion engine, a constant engine load or recording of the load change at the internal combustion engine, and an exhaust-gas temperature which is kept as constant as possible. Unlike when the quantity of exhaust gas is measured using the lambda sensor, the mass of secondary air injected can be determined within the first few seconds of a cold start of the internal combustion engine and therefore diagnosed by monitoring the rotational speed of the exhaust-gas turbocharger. This has the advantage that the determination of the secondary air mass is not bound by the operating temperature of the catalytic converter 5 being reached.

Figure 2:
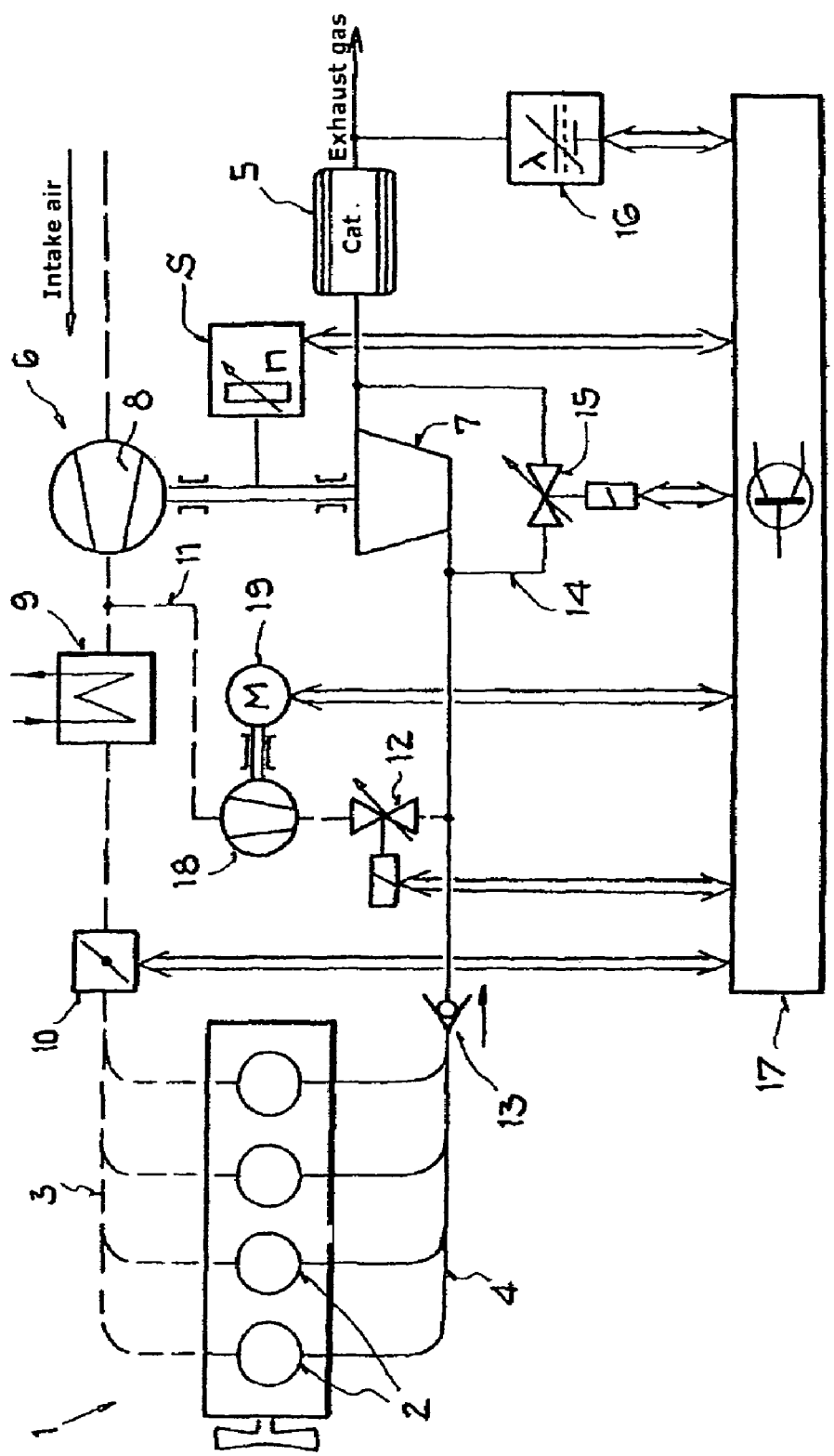
FIG. 2 shows an internal combustion engine with charge-air supercharging by an exhaust-gas turbocharger and with a secondary air charger for the secondary air injection.

FIG. 2 shows substantially the same apparatus features as the internal combustion engine shown in FIG. 1. In addition to the exemplary embodiments shown in FIG. 1, the exemplary embodiment shown in FIG. 2 also includes a motor-driven compressor 18 as secondary-air charger in the flow path of the secondary air injection. The compressor power can in this case be controlled by means of the controllable motor 19 via the control unit 17. The function of the control valve 12 in the secondary-air line 11 can be reduced to switching the secondary-air line 11 on and off if the power of the compressor is controlled. Secondary air injection with secondary-air supercharging has the advantage that it is possible to ensure that the pressure in the secondary-air line 11 is greater than the pressure in the exhaust system 4 at all operating points of the internal combustion engine.

Figure 3:
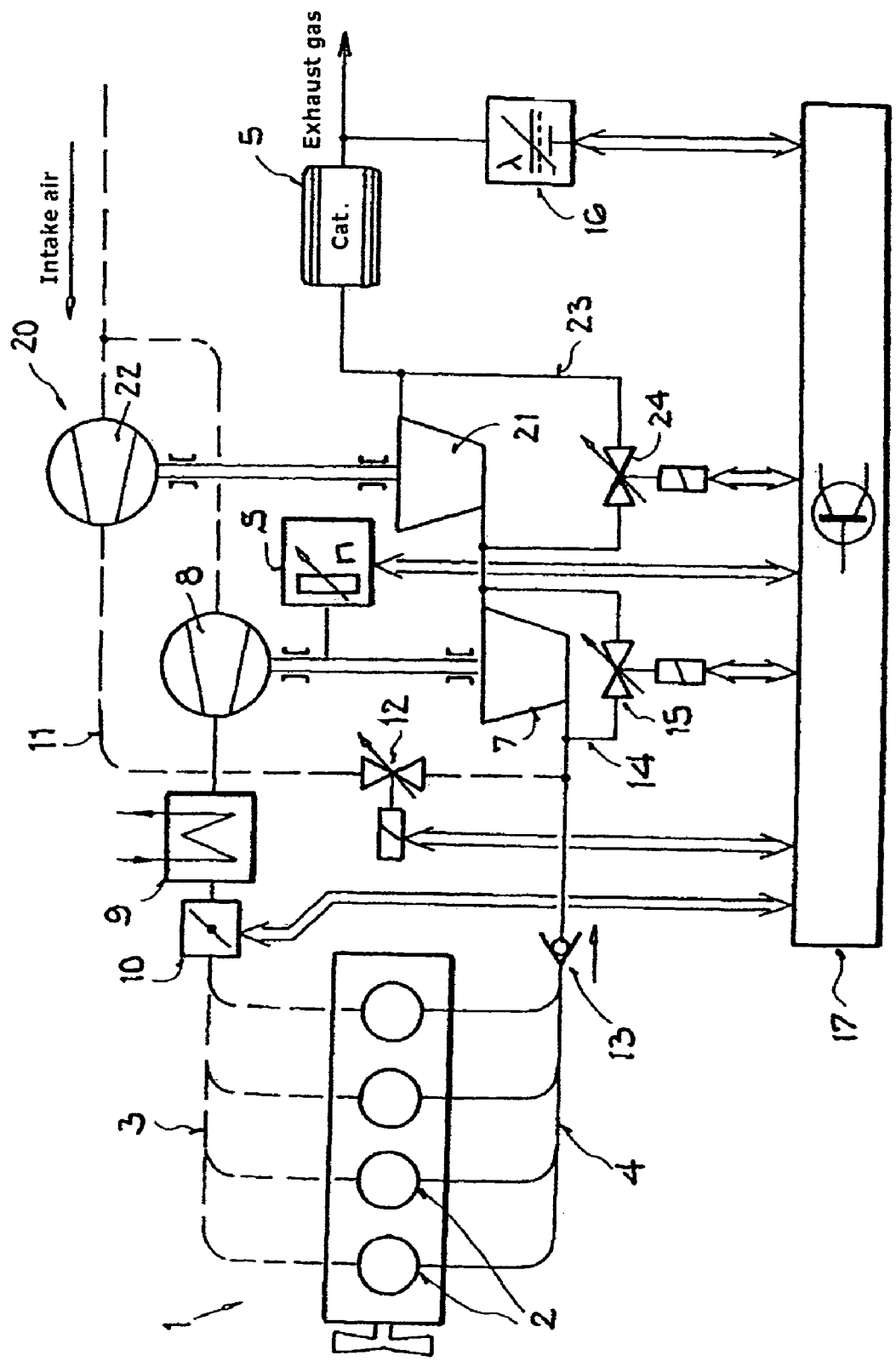
FIG. 3 shows an internal combustion engine with charge-air supercharging by an exhaust-gas turbocharger and a second, separate exhaust-gas turbocharger for the secondary air supercharging.

FIG. 3 once again shows substantially the same apparatus features as the exemplary embodiment illustrated in FIG. 1. Unlike in the two previous exemplary embodiments from FIG. 1 and FIG. 2, however, the exemplary embodiment shown in FIG. 3 has a modified flow path routing for the secondary air injection. In this exemplary embodiment, the secondary-air line 11 branches off from the intake section 3 upstream of the compressor 8 of the exhaust-gas turbocharger for the charge-air supercharging. Consequently, the secondary air injection can be completely decoupled from the charge-air supercharging. A secondary-air charger for compressing the secondary air can also be used in this decoupled secondary air injection. A suitable secondary-air charger is a motor-driven compressor, as shown in the exemplary embodiment illustrated in FIG. 2, or a second, further exhaust-gas turbocharger 20, the turbine 21 of which is located in the flow path of the exhaust system and the compressor 22 of which is located in the flow path of the secondary air injection. This second exhaust-gas turbocharger also has a bypass 23 for power control, the opening cross section of which bypass can be adjusted and controlled using a control valve 24.

Figure 4:
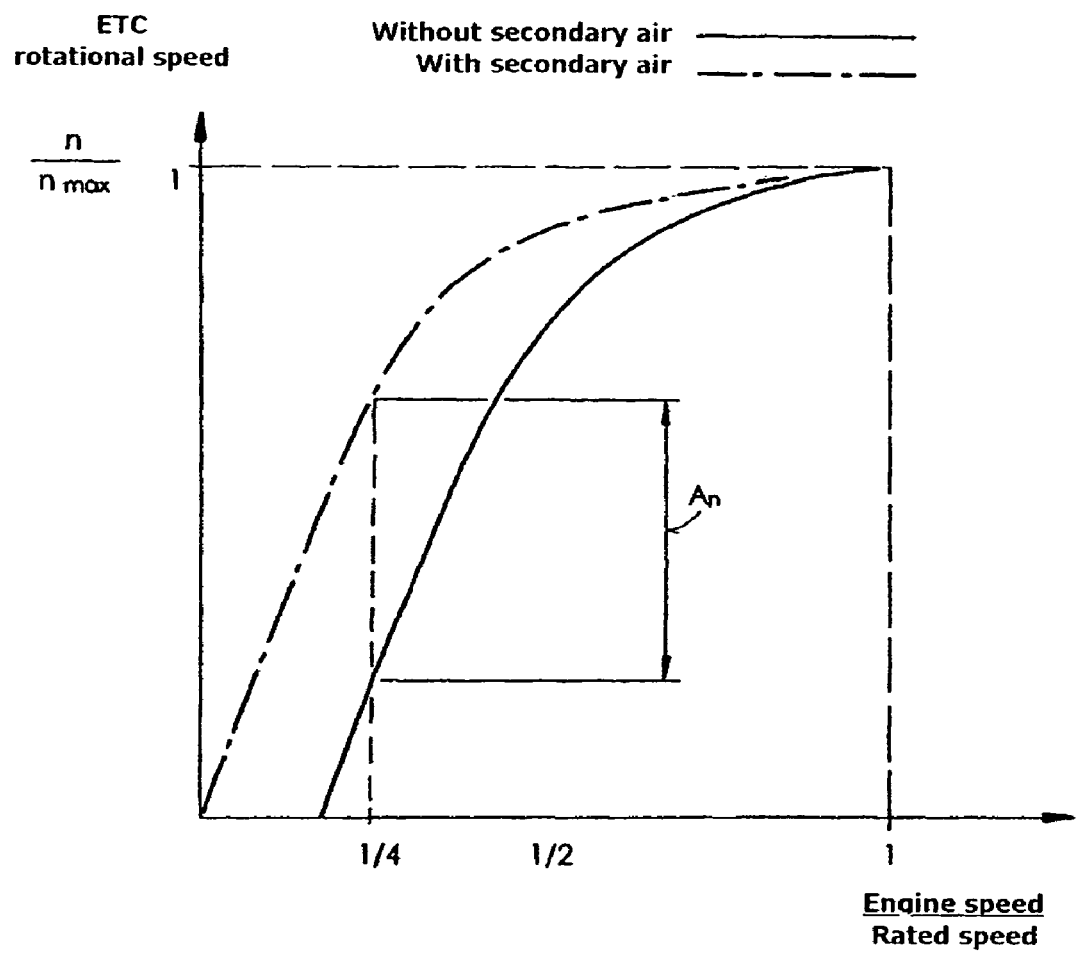
FIG. 4 shows an outline diagram of the evaluation of the change in rotational speed of the exhaust-gas turbocharger as a result of the secondary air injection.

A common feature to all the exemplary embodiments is the way in which the quantity of secondary air delivered is determined. The determination of the quantity of secondary air delivered is illustrated by the diagram presented in FIG. 4. According to the invention, the secondary-air line 11 for the secondary air injection opens out in the exhaust section upstream of the turbine of the exhaust-gas turbocharger 6. Consequently, secondary air injection into the exhaust system increases the rotational speed of the exhaust-gas turbocharger. Under otherwise constant operating conditions of the internal combustion engine, this increase in rotational speed is a direct measure of the quantity of secondary air injected. The rotational speed of the exhaust-gas turbocharger is plotted against the engine speed of the internal combustion engine in the diagram presented in FIG. 4, for explanation purposes. Both the rotational speed of the exhaust-gas turbocharger and the engine speed of the internal combustion engine are in this case normalized on the basis of a maximum speed. The engine speed is one of the most important operating parameters for determining the power delivered by the internal combustion engine. Other important operating parameters include in particular the torque, the mass flow of charge air, the engine temperature and others. For explanation purposes, only the engine speed was employed in order to make the diagram shown in FIG. 4 as simple as possible. Of course, it is also possible for multidimensional characteristic diagrams which also encompass the operating parameters listed above to be used to determine the quantity of secondary air delivered. Nevertheless, the basic principle whereby the rotational speed of the exhaust-gas turbocharger without secondary air injection is known at a given operating point of the internal combustion engine, and therefore an increase in the rotational speed of the exhaust-gas turbocharger established by a rotational-speed sensor makes it possible to determine the quantity of secondary air delivered as a result of secondary air injection, remains unchanged. The rotational-speed curve of the exhaust-gas turbocharger without secondary air injection is illustrated by a continuous line in FIG. 4. The rotational-speed curve of the exhaust-gas turbocharger with secondary air injection is illustrated by a dot-dashed line. The two rotational-speed curves are fundamentally known and stored as desired guide variables in the control unit 17 for controlling the power of the engine and for the thermal aftertreatment of the exhaust gases with secondary air. The actual rotational speed of the exhaust-gas turbocharger is determined and monitored using a rotational-speed monitoring unit. If secondary air injection is required, the quantity of secondary air injected is increased until the rotational speed of the exhaust-gas turbocharger, at a corresponding operating point of the internal combustion engine, approaches the desired characteristic curve (dot-dashed line) for the rotational-speed curve with secondary air injection. If a predetermined increase in rotational speed of this type is successful, the secondary air injection is in order. If the increase in the rotational speed to the desired characteristic curve is not successful, it is very likely that there is a fault in the secondary air path. This can be established using an evaluation program in the control unit, and a corresponding warning indication can be emitted. This allows simple diagnosis of the secondary air injection. Therefore, the measurement signal from the rotational-speed recording device can be used both to diagnose and to control the secondary air injection, i.e. any desired quantity of secondary air can be injected into the exhaust system and controlled depending on the operating point and temperature of the internal combustion engine.

In addition, the set and controlled values can be checked and their plausibility ensured by evaluating the lambda sensor signal. The lambda sensor measures the residual oxygen content in the exhaust gas. Therefore, the signal from this sensor allows a plausibility check as to whether or not secondary air injection is present.

It will be appreciated that the above description of the present invention is susceptible to various modifications, changes and adaptations, and the same are intended to be comprehended within the meaning and range of equivalents of the appended claims.

What is claimed is:

1. A method for monitoring the secondary air injection into the exhaust system of an internal combustion engine, in which the quantity of secondary air delivered is determined using a measuring device and is set using a controllable delivery device, and wherein:
   the turbine of an exhaust-gas turbocharger is arranged in the flow path of the exhaust system, and the compressor of the exhaust-gas turbocharger is arranged in the flow path of the intake section and compresses the intake air:
   the secondary air injection influences the rotational speed of the exhaust-gas turbocharger, and the change in rotational speed effected by the secondary air injection is recorded using the measuring device for determining the quantity of secondary air delivered; and,
   the recording of the rotational speed of the exhaust-gas turbocharger is used to diagnose the secondary air injection.

2. The method as claimed in claim 1, wherein the quantity of secondary air delivered is influenced using a control valve in the secondary-air line.

3. The method as claimed in claim 1, wherein the quantity of secondary air delivered is influenced by the feed line of a turbomachine in the secondary-air line.

4. The method as claimed in claim 1, wherein the quantity of secondary air delivered, if the mass of exhaust gas from the internal combustion engine is known, is determined from the difference in the rotational speed of the exhaust-gas turbocharger with secondary air injection and without secondary air injection.

5. The method as claimed in claim 1, wherein the change in the rotational speed of the exhaust-gas turbocharger as a result of the secondary air injection is used to control the secondary air injection.

6. The method as claimed in claim 1, wherein the diagnosis of the secondary air injection is based on the deviation in the measured rotational speed of the exhaust-gas turbocharger from a desired rotational speed which is known from the operating point of the internal combustion engine.

* * * * *